(12) United States Patent
Kondal et al.

(10) Patent No.: US 11,714,918 B1
(45) Date of Patent: Aug. 1, 2023

(54) AUTOMATED DATA PRIVACY COMPLIANCE SYSTEM

(71) Applicant: Amazon Technologies, Inc., Seattle, WA (US)

(72) Inventors: Tegdeep Kondal, Yorba Linda, CA (US); Apurv Singh, Bangalore (IN); Vikas Garg, Kirkland, WA (US); Hitansu Kumar Jena, Bangalore (IN); Brijesh Madhabhai Meshiya, Bangalore (IN); Mahesh Natrajan, Irvine, CA (US); Piyush Jain, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 471 days.

(21) Appl. No.: 16/809,429

(22) Filed: Mar. 4, 2020

(51) Int. Cl.
*G06F 21/62* (2013.01)
*G06F 21/60* (2013.01)
*G06F 16/16* (2019.01)
*G06F 21/32* (2013.01)

(52) U.S. Cl.
CPC .......... *G06F 21/6263* (2013.01); *G06F 16/162* (2019.01); *G06F 21/32* (2013.01); *G06F 21/604* (2013.01); *G06F 21/6227* (2013.01)

(58) Field of Classification Search
CPC ..... G06F 21/6263; G06F 21/32; G06F 21/604; G06F 21/6227; G06F 16/162
See application file for complete search history.

(56) References Cited

U.S. PATENT DOCUMENTS

| | | | |
|---|---|---|---|
| 10,181,051 B2* | 1/2019 | Barday et al. ...... | G06F 21/6254 |
| 10,289,870 B2* | 5/2019 | Barday et al. ......... | G06F 15/76 |
| 11,295,224 B1* | 4/2022 | Huang et al. .......... | G06N 7/005 |
| 2018/0089294 A1* | 3/2018 | Dray et al. ............ | G06F 16/25 |
| 2019/0180050 A1* | 6/2019 | Barday et al. ...... | G06F 21/6218 |
| 2019/0392173 A1* | 12/2019 | Brannon et al. .... | G06F 21/6245 |
| 2020/0342137 A1* | 10/2020 | Barday et al. ....... | G06F 16/128 |
| 2021/0383007 A1* | 12/2021 | Mardini et al. ..... | G06F 21/6254 |

* cited by examiner

*Primary Examiner* — Han Yang
(74) *Attorney, Agent, or Firm* — Eversheds Sutherland (US) LLP

(57) ABSTRACT

Systems, methods, and computer-readable media are disclosed for systems and methods for sending and receiving requests to delete and/or retrieve certain data. Example methods may include sending from an electronic device a request to delete and/or retrieve selected data from a server based on selected categories, receiving the request at the server, and determining data to delete and/or retrieve on the server based on the request from the electronic device, deleting and/or retrieving the data on the server, and/or sending the retrieved selected to the electronic device.

20 Claims, 7 Drawing Sheets

AUTOMATED DATA PRIVACY COMPLIANCE SYSTEM

BACKGROUND

Electronic devices, such as smartphones, tablets, smart-watches, smart-sensors and the like, may generate various types of data and may share this data with one or more servers. The electronic device and data generated may be associated with a user account and the data generated may be saved or otherwise stored on the one or more servers such that the data is associated with the user account and/or is otherwise connected to the user account. As different types of generated data may be saved on different servers, and some data may be saved on multiple servers, it may be difficult to keep track of the data. As it may be necessary to retrieve and/or delete the certain data, there may be a need to track, access, modify, and/or delete the generated data stored on the one or more servers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

The systems and methods herein may be used to manage (e.g., delete and/or retrieve) data generated by electronic devices and saved on a server. Electronic devices such as smart phones, tablets, personal computers, and the like may generate various types of data (e.g., personal data, voice data, text data, shopping history, installation history, use data, location data, protected health information, etc.). An electronic device may be associated with a user account and the data generated on the electronic device, or a portion thereof, may be sent to one or more servers and may be saved or otherwise stored on the one or more servers. The data saved to the one or more servers may be associated to and/or connected with the user account (e.g. the user account associated with the electronic device from which the data was generated). A data management platform may be used to keep track of the data saved and/or stored on the one or more servers. The data management platform may include a control server to oversee implementation of the data management platform. The control server may maintain and/or obtain a database or catalogue of data stored on the one or more servers, determine the location of the data (e.g., location of each file), determine the user account associated with the data, and determine information about the data.

The data management platform may be accessed from an electronic device. For example, an electronic device associated with a user account may be used to access the data management platform to manage data associated with the user account. In one example, the electronic device associated with the user account may be used to send instructions to the data management platform to retrieve and/or delete some or all of the data saved on the one or more servers (e.g., data servers) and associated with the user account. Upon instructing the data server to retrieve and/or delete some or all of the data associated with the user account, the control server may perform the desired action and may, optionally, send the requested data to the electronic device and/or make the requested data available via the electronic device.

Figure 1:
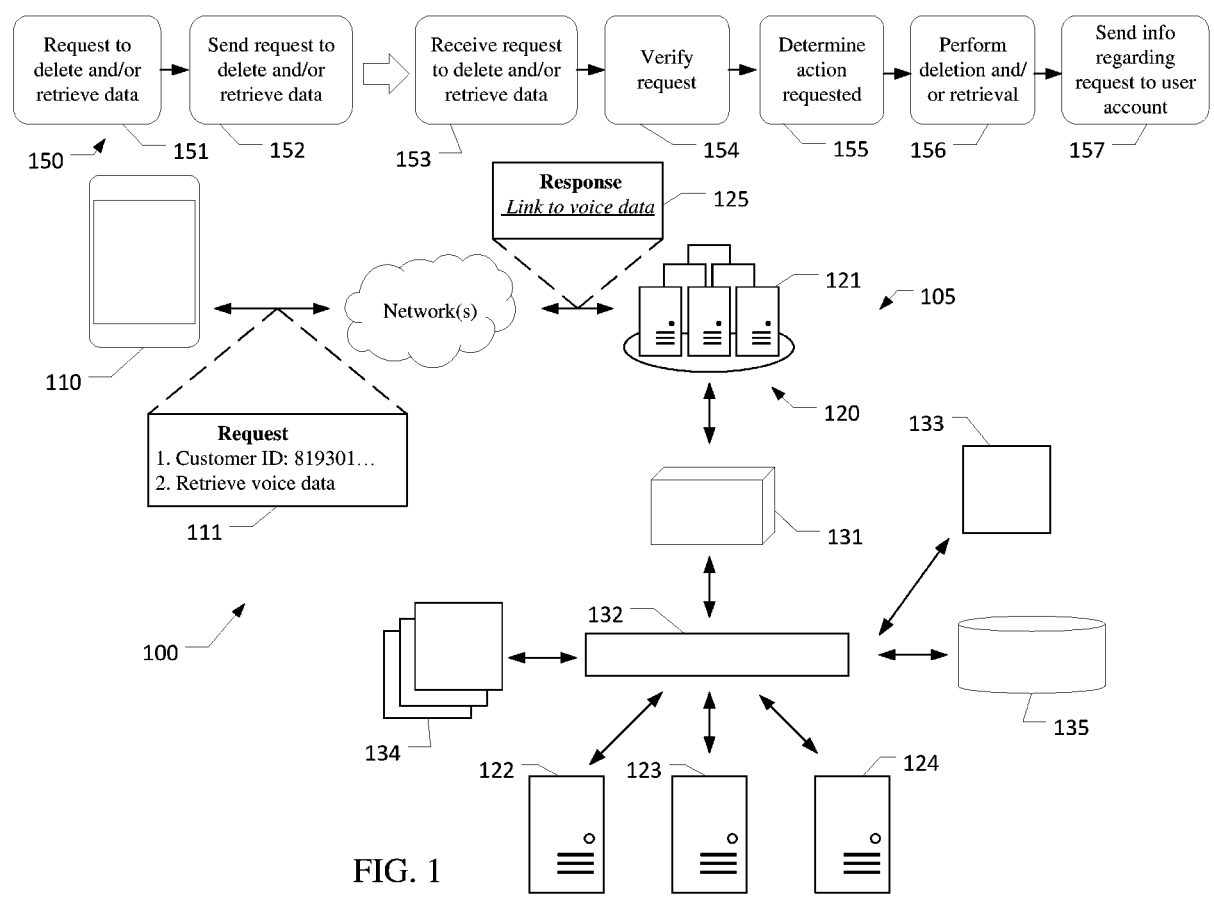
FIG. 1 is a schematic illustration of an example use case for a deleting and/or retrieving data in response to a request to delete and/or retrieve data in accordance with one or more example embodiments of the disclosure.

Referring to FIG. 1, an example use case 100 for deleting and/or retrieving data in response to a request to delete and/or retrieve data is depicted in accordance with one or more example embodiments of the disclosure. In the illustrated example, an electronic device 110 may communicate with a server 120, which may be one or more servers (e.g., control server and/or data server). Electronic device 110 may be any electronic device that may communicate with server 120 and/or other computing devices via any well-known wired or wireless system (e.g., Bluetooth, Bluetooth Low Energy (BLE), near field communication protocol, Wi-Fi®, cellular network, etc.). Electronic device 110 may include a user input (e.g., touch screen, buttons, microphone, keyboard, etc.) and may include a display (e.g., screen). Electronic device 110 may be a computing device with a processor and may optionally include one or more sensors. In the example illustrated in FIG. 1, electronic device 110 is a mobile device (e.g., smartphone) with a touchscreen display. Electronic device 110 is described in greater detail below with respect to FIG. 7.

Server 120 may be one or more computing devices in communication with electronic device 110. Server 130 may include control server 121 and other data servers such as servers, databases, datastores, and the like, such as datastore 122, datastore 123, and datastore 124. Datastore 122, datastore 123, and/or datastore 124, may be a server, datastore, and/or database, and/or any other device designed to save or otherwise store digital information. Server 130 is described in greater detail below with respect to FIG. 6.

Server 120 may further include action manager 131, implementation manager 132, configuration manager 133, policy manager 134, audit manager 135, which collectively may be the data management platform 105, together with other components described herein. Action manager 131 may receive data management instructions from electronic device 110, and determine a desired action (e.g., delete data and/or retrieve data) based on the instructions received from electronic device 110. Action manager 131 may correspond to and/or run action identifier module 626, discussed below with respect to FIG. 6. It is understood that in one example, action manager 131 may be eliminated and the determination of the desired action based on the instructions received from the electronic device 110 may be done manually. Implementation manager 132 may communicate and exchange information with action manager 131, configuration manager 133, policy manager 134, and audit manager 135 and may implement the desired action determined by action manager 131. Implementation manager 132 may correspond to and/or run implementation module 627, discussed below with respect to FIG. 6. Implementation module 627 may be located and/or may run on control server 121. Configuration manager 133 may determine the presence and/or location of data identified by electronic device 110. For example, configuration manager 133 may maintain a database, table, library and/or catalogue of data stored on server 120. Configuration manager 133 may correspond to and/or run configuration module 630. Policy manager 134 may maintain policies related to or otherwise regarding data management. For example, policy manager 134 may oversee compliance with various data management laws (e.g., General Data Protection Regulation (GDPR), Children's Online Privacy Protection Act (COPPA), Health Insurance Portability and Accountability Act (HIPAA), California Consumer Privacy Act (CCPA), etc.) and company or organization specific data management policies. Policy manager 134 may correspond to and/or run policy module 632. Audit manager 135 may maintain a log and/or history of data on server 120. For example, audit manager 135 may maintain a log of all data saved, retrieved, accessed, transferred and/or deleted from server 120. Audit manager 135 may correspond to and/or run audit log module 631.

To initiate the actions of deleting and/or retrieving data via the data management platform 105, an example process flow 150 is presented and may be performed, for example, by one or more modules at electronic device 110, server 120, and/or data management platform 105. The electronic device 110 and/or server 120 may include at least one memory that stores computer-executable instructions and at least one processor configured to access the at least one memory and execute the computer-executable instructions to perform various actions or operations, such as one or more of the operations in the process flow 150 of FIG. 1.

At a block 151, a user may request to delete and/or and or retrieve data via the electronic device 110. As explained in greater detail below, a user may access the data management platform 105 using electronic device 110 by accessing a web-based application on electronic device 110. Alternatively, the data management platform 105 may further include an application installed on electronic device 110 for communicating with the server 120. At block 151, the user may request a certain category or type of data to delete and/or retrieve (e.g., using the web-based application). At block 152, user device may send the request to delete and/or retrieve the data selected at block 151 (e.g., selected data) to server 120 (e.g., using the web-based application). Request 111 is an exemplary request and includes a customer identification number and instructions to retrieve voice data corresponding to the customer identification number. The voice data may include any digital data corresponding to a recording or capture of a voice or audio data generated by an electronic device associated with that customer ID.

At block 153, the server 120 may receive the request delete and/or retrieve data (e.g., request 111). At block 154, the server 120 may verify the request. For example, the information received from the electronic device 110 may have included user identification information and authentication data and server 120 may determine whether the authentication information corresponds to user identification information according to information saved on server 120 during registration (e.g., a user account and/or user profile). At step 155, the server 120 may determine which action is being requested. In one example, action manager 131 may determine whether the request received from electronic device 110 involves a request to delete data and/or retrieve data.

At block 156, server 120 may perform the deletion and/or retrieval of data requested by electronic device 110. As explained above, the request to delete and/or retrieve data may identify one or more categories of data to delete and/or retrieve from server 120. To perform the deletion and/or retrieval of data, implementation manager 132 may work with configuration manager 133 to determine the location of the data requested to be deleted and/or retrieved (e.g., selected data). For example, the location may be datastore 122, datastore 123 and/or datastore 124. Implementation manager 134 may further work with the policy manager 134 to determine if the requested data is affected by any policies in the policy manager 134. For example, the policy manager 134 may include an internal policy that certain data may not be deleted (e.g., for a number of years) and thus may inform the implementation manager 132 that the requested action may not be performed. Implementation manager 132 may communicate with datastore 122, datastore 123 and/or datastore 124 and instruct datastore 122, datastore 123 and/or datastore 124 to delete and/or retrieve the selected data. After performing the requested action, implementation manager 132 may instruct audit manager 135 to create one or more log entries regarding the action performed.

At block 157, information regarding the request to delete and/or retrieve data may be sent to electronic device 110. In one example, a message may be sent to electronic device (e.g., via SMS text or email) stating that the selected data has been retrieved and/or deleted. Additionally, the data retrieved from server 120 may be sent to electronic device 110. For example, response 125 may include a link to voice data as requested in request 111. The link may be used to download and/or view or listen to the data requested to be retrieved. In another example, the message sent to electronic device 110 may state that the requested data could not be retrieved and/or deleted and may give the reason why.

Embodiments of the disclosure may improve computing efficiency and bandwidth by reducing a number of actions and calculations that need to be performed to initiate certain tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
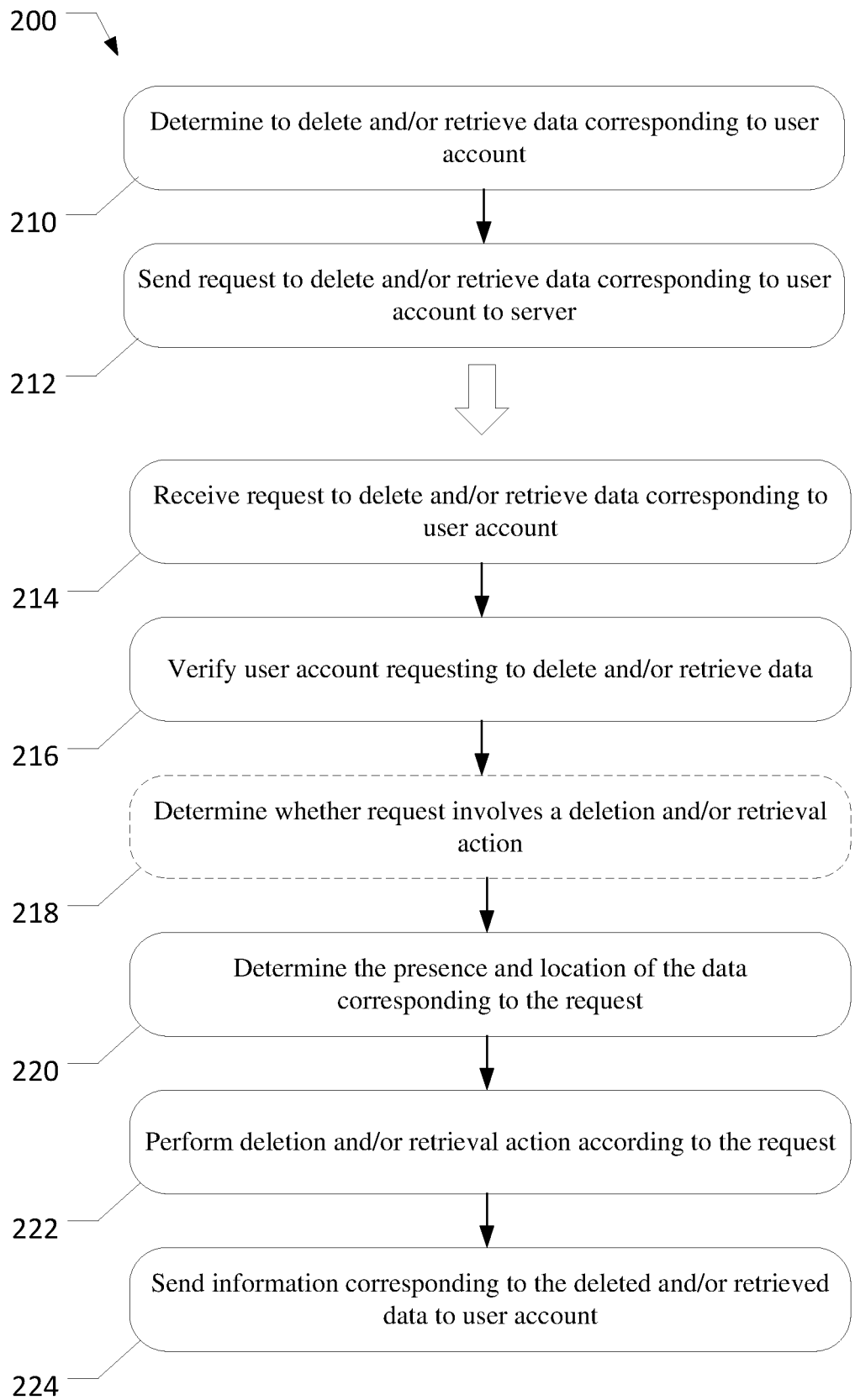
FIG. 2 is a schematic illustration of an example process flow for a deleting and/or retrieving data in response to a request to delete and/or retrieve data in accordance with one or more example embodiments of the disclosure.

FIG. 2 depicts an example process flow 200 for deleting and/or retrieving data in response to a request to delete and/or retrieve data in accordance with one or more example embodiments of the disclosure. Some or all of the blocks of the process flows in this disclosure may be performed in a distributed manner across any number of devices. The operations of the process flow 200 may be optional and may be performed in a different order.

At block 210, computer-executable instructions stored on a memory of a device, such as an electronic device, and/or the server may be executed to determine to delete and/or retrieve certain data corresponding to a user account. For example, a user may input this information into an electronic device. As explained above, the electronic device may access a web-based platform and/or may install an application to perform this function. The data selected to be retrieved and/or deleted may be data corresponding to a user account and also corresponding to one or more categories of data (e.g., voice data, text data, shopping data, installation data, etc.). At block 212, computer-executable instructions stored on a memory of a device, such as an electronic device, and/or the server may be executed to send the request to delete and/or retrieve the selected data to one or more servers. In the example of the web-based application, computer executable code executed at block 210 and block 212 may be action identifier module 624 illustrated in FIG. 6. In the example of the application running on the electronic device, computer executable code executed at block 210 and block 212 may be data selection module.

At block 214, computer-executable instructions stored on a memory of a device, such as a server, may be executed to receive the request to delete and/or retrieve data corresponding to the user account. Computer executable code executed at block 214 may be communication module 628 illustrated in FIG. 6. At block 216, computer-executable instructions stored on a memory of a device, such as a server, may be executed to verify a user account corresponding to the request to delete and/or retrieve data. For example, at block 212, the request to delete and/or retrieve data may include identification data and authentication data. Alternatively, the server may request and receive this information from the electronic device that generated the request. The server may determine whether the authentication data corresponds to the identification data for the user account by comparing the received authentication data to the authentication data stored on server 120 and associated with the user account (e.g. during registration). In one example, the identification data is a user or customer identification number or value and the authentication code is a password. Computer executable code executed at block 216 may be implementation module 627 illustrated in FIG. 6.

At optional block 218, if it is determined that the identification data corresponds to the authentication data, computer-executable instructions stored on a memory of a device, such as a server, may be executed to determine whether the request involves retrieving the data, deleting the data or retrieving and/or deleting data. For example, an action manager may make this determination. It is understood that the request may involve instructions to perform a first action (e.g., delete data) on a first set of data (e.g., a first category) and perform a second action (e.g., retrieve data) on a second set of data (e.g., a second category). Computer executable code executed at block 218 may be action identifier module 626 illustrated in FIG. 6. In another example, optional block 218 may be performed manually.

At block 220, computer-executable instructions stored on a memory of a device, such as a server, may be executed to determine the presence and the location of the data selected to be deleted and/or retrieved. An implementation manager may coordinate with a configuration manager to locate the selected data. As explained above, the request received from the electronic device 110 may define selected data as data associated with a customer identification value and/or a user account and may include several categories of data. The configuration manager may maintain and refer to a table, database and/or catalogue of data stored on the server to determine the presence and location (e.g., a datastore) of the selected data. In one example, the location may be one or more datastores. Computer executable code executed at block 220 may be implementation module 627 and/or configuration module 630 illustrated in FIG. 6.

At block 222, computer-executable instructions stored on a memory of a device, such as a server, may be executed to perform deletion and/or retrieval of the selected data in the request received by the electronic device. The implementation manager may communicate with one or more datastores where the selected data has been stored to delete and/or retrieve the selected data. For example, data of different types (e.g., PDF and mp3 files) may be deleted and/or retrieved. Computer executable code executed at block 220 may be implementation module 627. At block 224 computer-executable instructions stored on a memory of a device, such as a server, may be executed to send a response corresponding to the request to delete and/or retrieve data to a user account associated with the request. The response may be sent via SMS text, push notification, email, or any other well-known technique for sending information. The response sent at block 224 may include confirmation that the selected data has been deleted or retrieved. The response may also include a link to view, download and/or access the retrieved data. In another example, the retrieved data may be sent directly to electronic device 110 (e.g., in an attachment).

Figure 3:
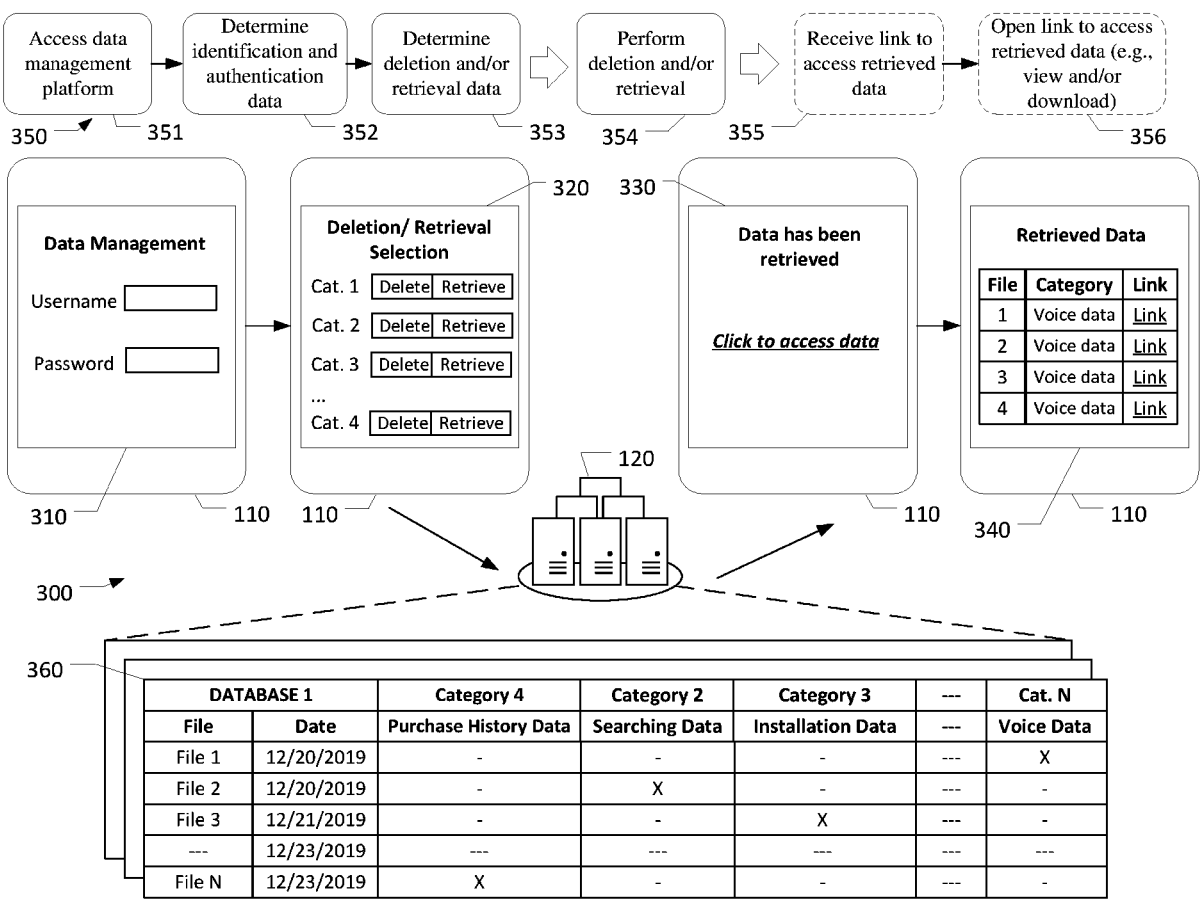
FIG. 3 is a schematic illustration of an example use case for accessing a data management system to delete and/or retrieve data in accordance with one or more example embodiments of the disclosure.

Referring to FIG. 3, an example use case 300 for accessing a data management system to delete and/or retrieve data is depicted in accordance with one or more example embodiments of the disclosure. In the illustrated example, electronic device 110 may communicate with server 120 in the same manner described above with respect to FIG. 1. To initiate the actions of accessing a data management system to delete and/or retrieve data, an example process flow 350 is presented and may be performed, for example, by one or more modules on electronic device 110 and/or server 120. The electronic device 110 and/or server 120 may include at least one memory that stores computer-executable instructions and at least one processor configured to access the at least one memory and execute the computer-executable instructions to perform various actions or operations, such as one or more of the operations in the process flow 350 of FIG. 3.

At block 351, electronic device may access the data management platform and/or system (e.g., data management platform 105). In one example, the electronic device 110 may access a web-based application to interface with the data management platform. In another example, a local application may be installed on the mobile device 110 to interface with the server 120. At block 352, electronic device 110 may determine identification data and/or authentication data. For example, electronic device 110 may receive username information and password information, as is shown on interface 310. Interface 310 is exemplary of a user interface that may be displayed on electronic device 110 for determining identification data and authentication data. The username and password may be associated with a user account and may be saved to server 120.

At block 353, electronic device 110 may determine data to delete and/or retrieve from server 120. For example, the electronic device may present several categories of data corresponding to a user account (e.g., voice data, text data, installation data, shopping data, HIPAA data, COPPA data, protected health information (PHI), etc.) that may be selected for deletion and/or retrieval. Interface 320 is exemplary of a user interface that may be displayed on electronic device 110 for determining deletion and/or retrieval of data. As shown in FIG. 3, several categories may be listed and for each category, deletion and/or retrieval of data corresponding to that category and corresponding to the user account may be engaged. Each category may be referred to as a connector as it connects the type of data associated with the user account to the data stored on the server 120 and permits the server 120 to select that data on the server 120 for deletion and/or retrieval. Upon selecting whether to delete and/or retrieve each category, the selected data may be sent or otherwise communicated to server 120. The categories of data saved on server 120 may be communicated to electronic device 110 such that the categories presented on the web-based application or local application on the electronic device reflect the same categories maintained and managed on the data management platform. It is understood that data corresponding to or otherwise associated with each type of category may be saved on one or more servers or data stores (e.g. datastore 122, datastore 123, and/or datastore 124).

At block 354, server 120 may receive the categories of selected data to be deleted and/or retrieved. As explained above with respect to FIG. 1, server 120 may determine what categories of data have been selected for retrieval and/or deletion. Once identifying the categories, server 120 must locate the data on server 120 corresponding to the selected categories and the user account. As explained in FIG. 1, implementation manager 132 may work together with configuration manager 133 to locate the data corresponding to the user account and selected categories (e.g., selected data). To keep track of the data saved or otherwise stored on server 120 (e.g., in datastore 122, datastore 123, and/or datastore 124), configuration manager may maintain a table, database, catalogue, or the like. For example configuration manager may maintain table 360 which may include an entry for each file or piece of data saved on the server 120 and may indicate whether the file or piece of data corresponds to various categories (e.g., purchase history data, searching data, installation data, voice data, etc.). Configuration manager 133 may maintain a table for each datastore and/or may maintain a master table for multiple datastores. Table 360 may include other information such as date, author, type of data, datastore identifier, etc. The categories monitored by configuration manager 133 may correspond to the selectable categories in interface 320 such that the request received from electronic device 110 may be seamlessly processed by implementation manager 132 and/or configuration manager 133 to determine the presence and location of the selected data. In one example, a category may be customized using interface 320 (e.g., a date range). Upon locating the selected data and identifying the requested action, implementation manager 132 may oversee the performance of the desired action such that the selected data is deleted and/or retrieved as request.

At block 355, server 120 may send retrieved data to an electronic device 110 associated with the user account. For example, server 120 may send an email to an email account associated with the user account. The email may confirm that the selected data has been retrieved and/or may include a link to access, download and/or otherwise view the retrieved selected data. For example, interface 330 illustrates a message with a link to the retrieved selected data. Interface 330 is exemplary of a user interface that may be displayed on electronic device 110 for accessing the retrieved data via a link. In another example, server 120 may send the link via an SMS text or push notification. In yet another example, server 120 may send electronic device 110 the retrieved data attached to an email. It is understood that in some examples, the request may include a request to retrieve the selected data, to send the selected data to the electronic device, and to delete the selected data. At block 356, the link may be accessed by the electronic device 110 to access (e.g., view and/or download) the retrieved data. For example, interface 340 illustrates links to requested selected data organized in a table that may be used to access, download, view and/or otherwise retrieve the requested selected data. Interface 340 is exemplary of a user interface that may be displayed on electronic device 110 for accessing selected data.

Figure 4:
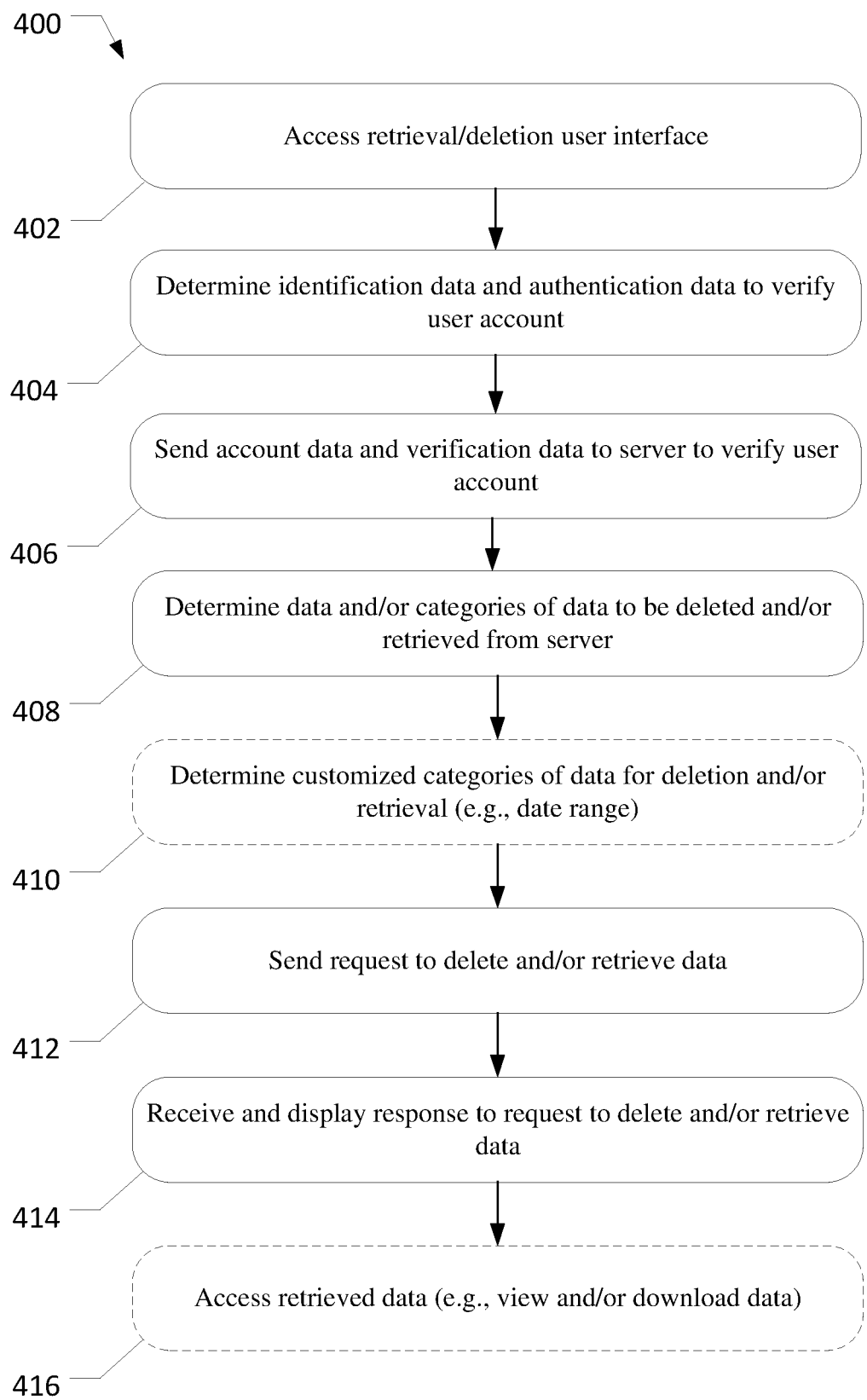
FIG. 4 is a schematic illustration of an example process flow for accessing a data management system to delete and/or retrieve data in accordance with one or more example embodiments of the disclosure.

FIG. 4 depicts an example process flow 400 for accessing a data management system to delete and/or retrieve data. While example embodiments of the disclosure may be described in the context of electronic devices, it should be appreciated that the disclosure is more broadly applicable to various types of mobile and/or computing devices. Some or all of the blocks of the process flows in this disclosure may be performed in a distributed manner across any number of devices. The operations of the process flow 400 may be optional and may be performed in a different order.

At block 402, computer-executable instructions stored on a memory of a device, such as an electronic device, may be executed to access a retrieval and/or deletion user interface for communicating with a server using the electronic device. As explained above, the electronic device may be used to access a web-based application which may be displayed on the electronic device and used to access the retrieval and/or deletion user interface (e.g., interface 310, interface 320, interface 330, and/or interface 340). Alternatively, or in addition, an application may be installed locally on the electronic device and may be designed to display the retrieval and/or deletion user interface for communicating with the server using the electronic device.

At block 404, computer-executable instructions stored on a memory of a device, such as an electronic device, may be executed to determine identification data and authentication data to verify a user account. Identification data may be a customer and/or user name, number and/or value. Authentication data may be a value (e.g., alphanumeric value or passcode) associated with the identification data (e.g., during registration). A server may save the registration information and may know the authentication data associated with the identification data. At block 406, computer-executable instructions stored on a memory of a device, such as an electronic device, may be executed to send identification data and authentication data to the server to verify a user account corresponding to the identification data.

At block 408, computer-executable instructions stored on a memory of a device, such as an electronic device, may be executed to determine data and/or categories of data to be deleted and/or retrieved from the server. Using the interface generated at block 402 and displayed on the electronic device, certain categories of data (e.g., purchase history data, searching data, installation data, voice data, text data) may be selected for retrieval and/or deletion (e.g., using interface 320). At optional block 410, computer-executable instructions stored on a memory of a device, such as an electronic device, may be executed to determine customized categories of data for deletion and/or retrieval. For example, a date range may be determined and used as a data category. In another example, multiple user accounts may be associated with a group account and one or more user accounts for which data should be deleted and/or retrieved may be selected as a category. At block 412, computer-executable instructions stored on a memory of a device, such as an electronic device, may be executed to send a request to delete and or retrieve the data selected at block 408 and optionally 410 to the server. In one example, the categories selected and the corresponding deletion and/or retrieval instructions may be sent to the server. This may be achieved by submitting the selections on the interface displayed on the electronic device.

At block 414, computer-executable instructions stored on a memory of a device, such as an electronic device, may be executed to receive and display a response to the request to delete and/or retrieve the selected data. For example, the server may send a message to the electronic device (e.g., via email or SMS text) confirming that the requested action (e.g., deletion and/or retrieval) was successful. The message may further include retrieved selected data in the form of a link and/or attachment. At block 416, computer-executable instructions stored on a memory of a device, such as an electronic device, may be executed to access retrieved data. For example, the electronic device may display several links that may be used to access, view, and/or download the retrieved data. Alternatively, the retrieved data may be sent directly to the electronic device (e.g., as an attachment).

Figure 5:
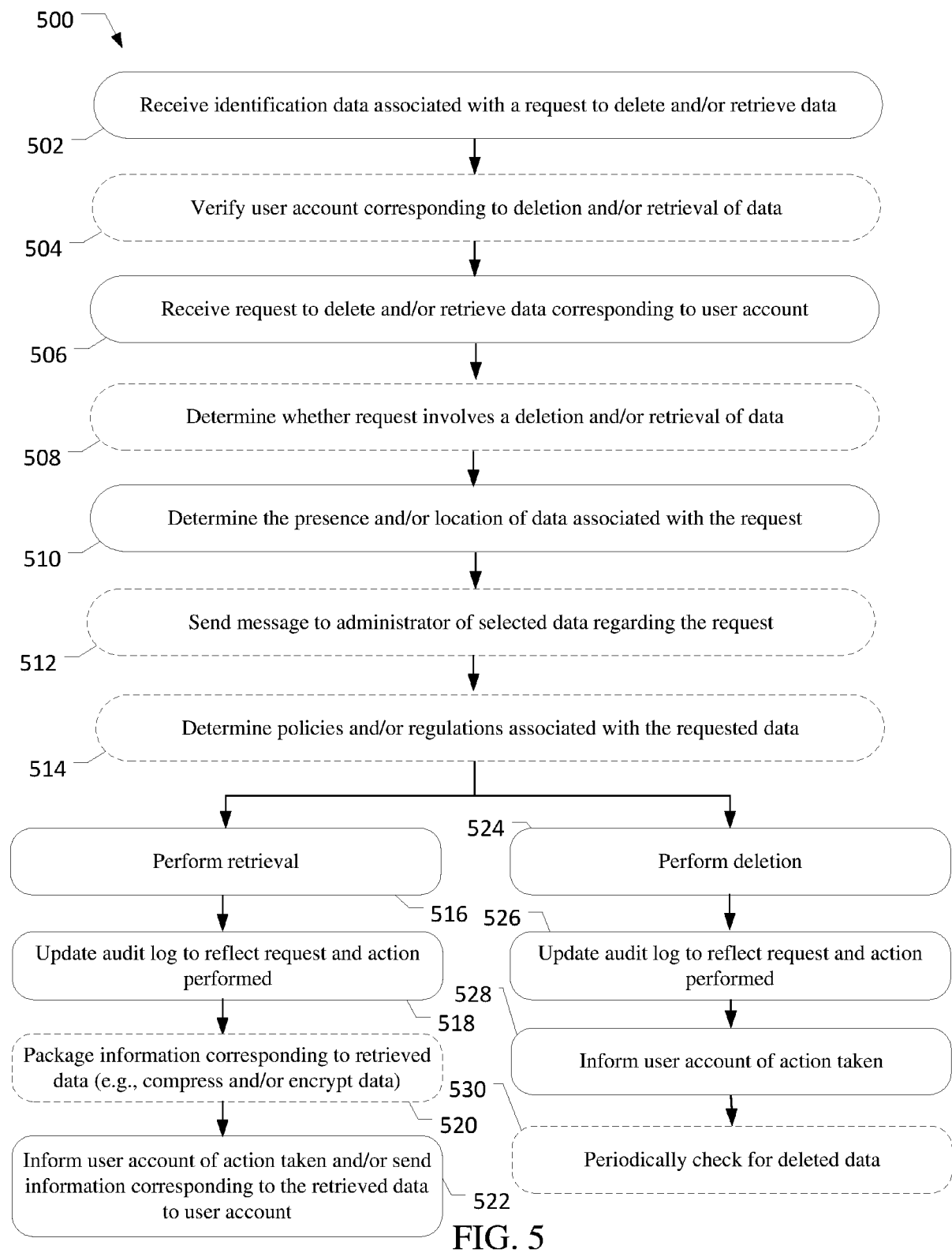
FIG. 5 is a schematic illustration of an example process flow for receiving data management instructions and deleting and/or retrieving data in accordance with one or more example embodiments of the disclosure.

FIG. 5 depicts an example process flow 500 process flow for receiving data management instructions and deleting and/or retrieving data. While example embodiments of the disclosure may be described in the context of a server, it should be appreciated that the disclosure is more broadly applicable to various types of electronic and/or computing devices. Some or all of the blocks of the process flows in this disclosure may be performed in a distributed manner across any number of servers and/or devices. The operations of the process flow 400 may be optional and may be performed in a different order.

At block 502, computer-executable instructions stored on a memory of a device, such as a server, may be executed to receive identification data associated with a request to delete and/or retrieve data. Authentication data may also be received. Computer executable code executed at block 502 may be communication module 628. At optional block 504, computer-executable instructions stored on a memory of a device, such as a server, may be executed to verify the user account corresponding deletion and/or retrieval of data. For example, during registration authentication data may be associated with identification data corresponding to a user account and server may use the received identification data and authentication data to determine that the authentication data corresponds to the identification data corresponding to the user account. Computer executable code executed at block 504 may be implementation module 627 illustrated in FIG. 6.

At block 506, computer-executable instructions stored on a memory of a device, such as a server, may be executed to receive a request to delete and/or retrieve data corresponding to the user account. As explained above, the request may include categories of data to be retrieved and/or deleted. The request may include categories of data for deletion and/or retrieval, and based on the categories and user account information received at block 502, the server may determine the data selected for retrieval and/or deletion. Computer executable code executed at block 506 may be communication module 628. At optional block 508, computer-executable instructions stored on a memory of a device, such as a server, may be executed to determine whether the request involves deleting selected data, retrieving selected data, or retrieving and deleting selected data. The server may make this determination based on the instructions received in the request at block 506. Computer executable code executed at block 508 may be action identifier module 626 illustrated in FIG. 6. Alternatively, this operation may be performed manually.

At block 510, computer-executable instructions stored on a memory of a device, such as a server, may be executed to determine the presence and/or location of data associated with the request at block 506. As explained above, the server may maintain a table (e.g., table 360), catalogue, directory, database, or otherwise track data saved to the server. For example, the table may associate data saved to the server to categories of data, to user or group accounts, to datastores (e.g., datastore 122, datastore 123, datastore 124), to dates, and/or any other information used to categorize and keep track of the saved data. Server may consult with the table, for example, to determine if the data selected in the instructions received at block 506 is saved to the server and determine the location of the data saved on the server (e.g., datastore 122, datastore 123, datastore 124). Computer executable code executed at block 510 may be implementation module 627 and/or configuration module 630 illustrated in FIG. 6.

At optional block 512, computer-executable instructions stored on a memory of a device, such as a server, may be executed to send a message to the administrator or administrators of the selected data regarding the request to delete and/or retrieve the selected data. The server may determine the corresponding administrator based on the table, for example. The message may alert or warn the administrator that the selected data is to be retrieved and/or deleted. Computer executable code executed at block 512 may be implementation module 627 and/or communication module 628. At optional block 514, computer-executable instructions stored on a memory of a device, such as a server, may be executed to determine if there are any policies and/or regulations associated with the selected data. For example, a company may maintain an internal policy that certain data must be archived for a certain period of time. In another example, statutory regulations may set forth requirements for sending and/or viewing certain types of data (e.g., HIPAA requirements for protected health information). Computer executable code executed at block 514 may be implementation module 627 and/or policy module 632 illustrated in FIG. 6.

At block 516, computer-executable instructions stored on a memory of a device, such as a server, may be executed to retrieve certain selected data designated for retrieval in the instructions received at block 506. This may involve coordinating with one or more servers or servers where selected data is stored to retrieve the selected data or a copy of the selected data. It is understood that the data may be stored on or more servers or datastores that may not be in contact with one another. Computer executable code executed at block 516 may be implementation module 627. At block 518, optional computer-executable instructions stored on a memory of a device, such as a server, may be executed to update an audit log to reflect the request received at block 506 and/or the action taken in response to the request (e.g., retrieve selected data). Computer executable code executed at block 518 may be audit log module 631 illustrated in FIG. 6.

At block 520, optional computer-executable instructions stored on a memory of a device, such as a server, may be executed to package information corresponding to the retrieved selected data to be sent to an electronic device. For example, a copy of the selected data may be retrieved and compressed and/or encrypted. Computer executable code executed at block 520 may be implementation module 627 and/or communication module 628. At block 522, optional computer-executable instructions stored on a memory of a device, such as a server, may be executed to inform the user account associated with the request at block 506 of the action taken (e.g. retrieving selected data) and/or may send the information corresponding to the retrieved selected data to the user account. For example, the server may send an email to an email account associated with the user account and/or an SMS text to an electronic device associated with the user account with a link and/or attachment for viewing and/or downloading the retrieved selected data. Computer executable code executed at block 522 may be implementation module 627 and/or communication module 628 illustrated in FIG. 6.

At block 524, computer-executable instructions stored on a memory of a device, such as a server, may be executed to delete certain selected data designated for deletion in the instructions received at block 506. This may involve coordinating with one or more servers where selected data is stored to delete the selected data. It is understood that the data may be stored on or more servers or datastores that may not be in contact with one another. Computer executable code executed at block 524 may be implementation module 627. At block 526, computer-executable instructions stored on a memory of a device, such as a server, may be executed to update an audit log to reflect the request received at block 506 and/or the action taken in response to the request (e.g., delete selected data). Computer executable code executed at block 526 may be audit log module 631 illustrated in FIG. 6.

At block 528, computer-executable instructions stored on a memory of a device, such as a server, may be executed to inform the user account associated with the request at block 506 of the action taken (e.g. deleting selected data). For example, the server may send an email to an email account associated with the user account and/or an SMS text to an electronic device associated with the user account providing information about the action taken. Computer executable code executed at block 528 may be implementation module 627 and/or communication module 628. At block 530, computer-executable instructions stored on a memory of a device, such as a server, may be executed to periodically check the server for the deleted data. For example, the selected data that has been deleted may be subsequently saved to the server (e.g., the data may be unintentionally uploaded to the server by a user account). The server may be designed to periodically (e.g., every hour, every day, every week) determine whether the selected data that has been deleted is saved to the server. If it is determined that the data is saved to the server, blocks 524-530 may be repeated. Computer executable code executed at block 530 may be implementation module 627. It is understood, that more than one request to delete and/or retrieve data may be received by the server and that the steps in FIG. 5 may be repeated in response to more than one request.

Illustrative Device Architecture

Figure 6:
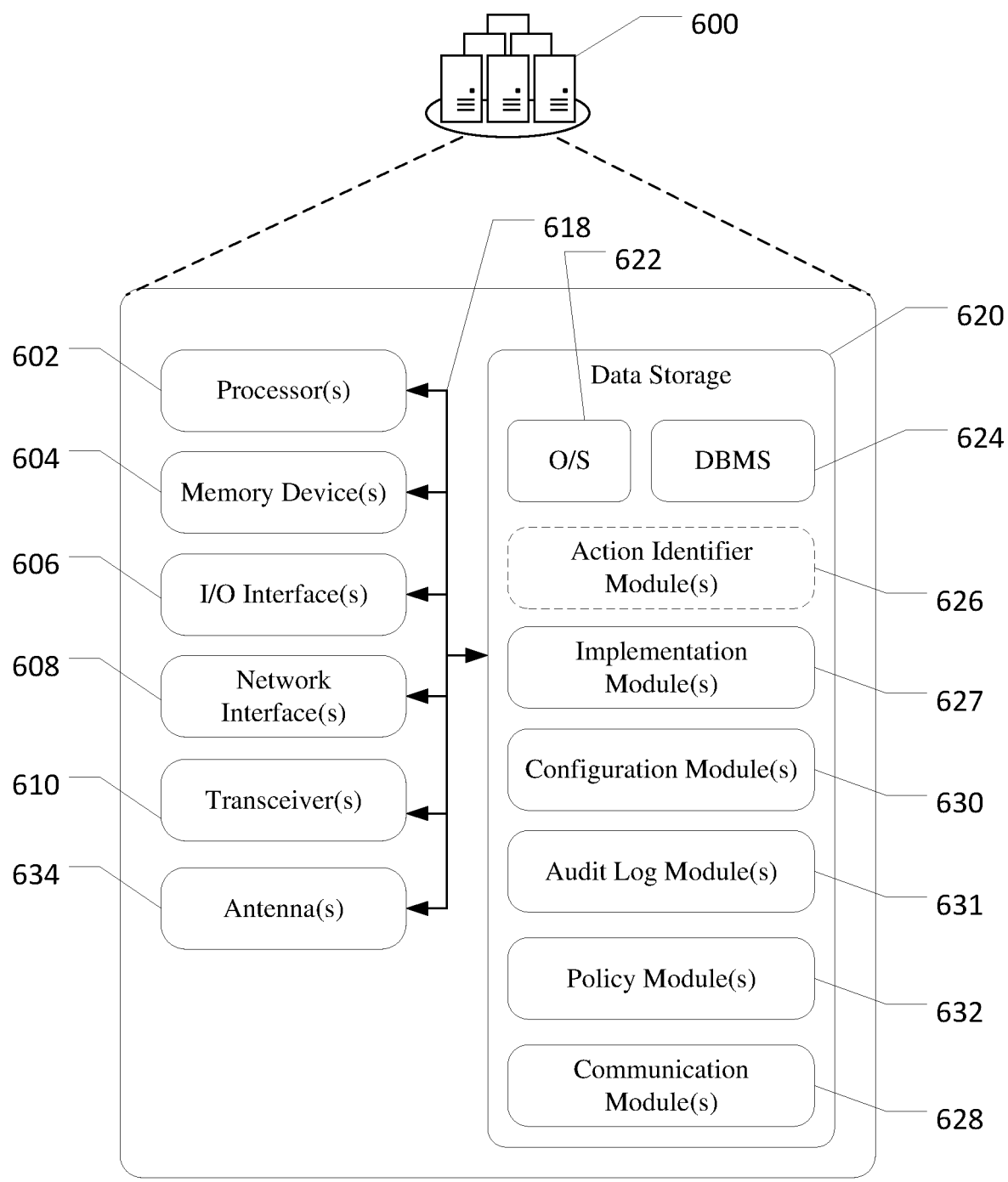
FIG. 6 is a schematic block diagram of one or more servers in accordance with one or more example embodiments of the disclosure.

FIG. 6 is a schematic block diagram of an illustrative server 600 in accordance with one or more example embodiments of the disclosure. The server 600 may be one or more servers and may include any suitable server, computing device and/or datastore capable of receiving and/or sending data, and may optionally be coupled to devices including, but not limited to, an electronic device such as a smartphone, computing device, laptop computer, desktop computer, tablet, e-reader, mobile device, wearable device, or the like. The server 600 may correspond to an illustrative device configuration for server 120 and any other server of FIGS. 1-5.

The server 600 may be configured to communicate via one or more networks with one or electronic devices, search engines, user devices, servers, datastores or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more input/output (I/O) interface(s) 606, one or more network interface(s) 608, one or more transceivers 610, one or more antenna(s) 634, and data storage 620. The server 600 may further include one or more buses 618 that functionally couple various components of the server 600. The server 600 may further include one or more antenna(e) 634 that may include, without limitation, a cellular antenna for transmitting or receiving signals to/from a cellular network infrastructure, an antenna for transmitting or receiving Wi-Fi® signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more optional database management systems (DBMS) 624; and one or more program module(s), applications, engines, computer-executable code, scripts, or the like such as, for example, one or more optional action identifier module(s) 626, one or more implementation module(s) 627, one or more configuration module(s) 630, one or more audit log module(s) 631, one or more policy module(s), and/or one or more communication module(s) 628. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable micro architecture design that includes any number of constituent components such as, for example, registers, multiplexers, arithmetic logic units, cache controllers for controlling read/write operations to cache memory, branch predictors, or the like. The micro architecture design of the processor(s) 602 may be capable of supporting any of a variety of instruction sets.

Referring now to functionality supported by the various program module(s) depicted in FIG. 6, the action identifier module(s) 626 may include computer-executable instructions, code, or the like that responsive to execution by one or more of the processor(s) 602 may perform functions including, but not limited to, determining the action (e.g., delete and/or retrieve selected data) requested in a set of instructions to retrieve and/or retrieve selected data.

The implementation module(s) 627 may include computer-executable instructions, code, or the like that responsive to execution by one or more of the processor(s) 602 may perform functions including, but not limited to, overseeing coordination and interaction between one or more modules and computer executable instructions in data storage 620, determining user selected actions and tasks, determining actions associated with user interactions, determining actions associated with user input, determining user devices associated with a user account, sending signals to user devices, electronic devices, other computing devices, servers, datastores and the like, initiating commands locally or at remote devices, and the like.

The configuration module 630 may include computer-executable instructions, code, or the like that responsive to execution by one or more of the processor(s) 602 may perform functions including, but not limited to maintaining a log, table, database, catalogue or the like of all data stored on the server and the categories (e.g., connectors) associated with the data as well as other information associated with the data such as a user or group account, the type of file and/or the date. Configuration module 630 may determine the presence and/or location of selected data based on the select categories, a user or group account and/or other relevant information.

The audit log module 631 may include computer-executable instructions, code, or the like that responsive to execution by one or more of the processor(s) 602 may perform functions including, but not limited to keeping a log or otherwise keeping track of the data saved on the server and the actions performed on the data saved on the server (e.g., save, delete, retrieve, etc.).

The policy module 632 may include computer-executable instructions, code, or the like that responsive to execution by one or more of the processor(s) 602 may perform functions including, but not limited to maintaining company and/or internal policies as well as statutory and/or government regulations or policies regarding the use, deletion, viewing, transmission, archiving and/or saving of data. Policy module 632 may be updated to reflect the latest rules and policies.

The communication module(s) 628 may include computer-executable instructions, code, or the like that responsive to execution by one or more of the processor(s) 602 may perform functions including, but not limited to, communicating with one or more devices, for example, via wired or wireless communication, communicating with electronic devices, communicating with servers (e.g., remote servers), communicating with remote datastores and/or databases, sending or receiving notifications or commands/directives, communicating with cache memory data, communicating with user devices, and the like.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Nonlimiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

Antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for - in cooperation with the antenna(e) 634 - transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving - potentially in cooperation with any of antenna(e) 634 - communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

Figure 7:
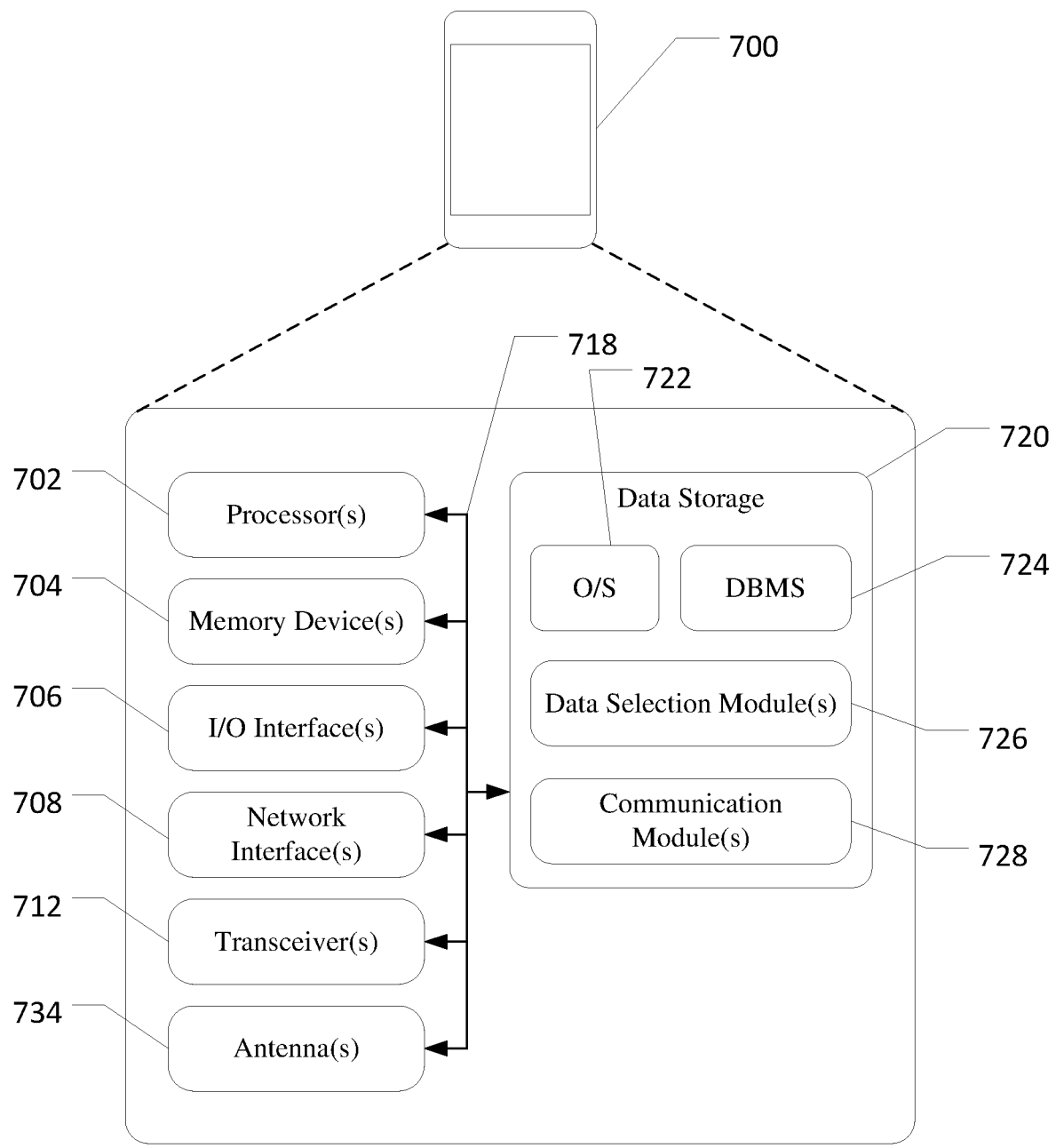
FIG. 7 is a schematic block diagram of an electronic device in accordance with one or more example embodiments of the disclosure.

FIG. 7 is a schematic block diagram of an electronic device 700 in accordance with one or more example embodiments of the disclosure. The electronic device 700 may be a mobile device, laptop computer, desktop computer, tablet, computing device, smartphone, e-reader, wearable device, or the like, or otherwise may include any suitable computing device capable of receiving and/or sending data, and may be coupled to other computing devices such as a server, for example. The electronic device 700 may correspond to an illustrative device configuration for electronic device 110, and any other electronic devices of FIGS. 1-5.

The electronic device 700 may be configured to communicate via one or more networks with one or more servers, search engines, user devices, electronic devices, connected devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device 700 may include one or more processors (processor(s)) 702, one or more memory devices 704 (generically referred to herein as memory 704), one or more optional input/output (I/O) interface(s) 706, one or more network interface(s) 708, one or more transceivers 712, one or more antenna(s) 734, and data storage 720. The electronic device 700 may further include one or more buses 718 that functionally couple various components of the electronic device 700. These various components will be described in more detail hereinafter.

The electronic device 700 may further include one or more antenna(e) 734 that may have the same or substantially the same features, operation, and/or functionality as described above with respect to antenna(e) 634. The bus(es) 718 may have the same or substantially the same features, operation, and/or functionality as described above with respect to bus(es) 618. The memory 704 may have the same or substantially the same features, operation, and/or functionality as described above with respect to memory 604.

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more optional database management systems (DBMS) 724; and one or more program module(s), applications, engines, computer-executable code, scripts, or the like such as, for example, one or more data selection module(s) and/or one or more communication module(s) 728. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the electronic device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute computer-executable instructions loaded therein. For example, the processor(s) 702 may be configured to execute computer-executable instructions of the various program module(s), applications, engines, or the like of the electronic device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable micro architecture design that includes any number of constituent components such as, for example, registers, multiplexers, arithmetic logic units, cache controllers for controlling read/write operations to cache memory, branch predictors, or the like. The micro architecture design of the processor(s) 702 may be capable of supporting any of a variety of instruction sets.

Referring now to functionality supported by the various program module(s) depicted in FIG. 7, the data selection module(s) 726 may include computer-executable instructions, code, or the like that responsive to execution by one or more of the processor(s) 702 may perform functions including, but not limited to, generating an interface to be displayed on electronic device 600 to facilitate communication between electronic device 600 and a server (e.g., server 120). The interface may receive identification information, authentication information, category information and may display information about requested data.

The communication module(s) 728 may include computer-executable instructions, code, or the like that responsive to execution by one or more of the processor(s) 702 may perform functions including, but not limited to, communicating with one or more devices, for example, via wired or wireless communication, communicating with servers (e.g., remote servers), electronic devices, user devices, mobile devices, communicating with remote datastores and/or databases, sending or receiving notifications or commands/directives, communicating with cache memory data, communicating with user devices, and the like.

Referring now to other illustrative components depicted as being stored in the data storage 720, the O/S 622 may be loaded from the data storage 720 into the memory 704 and may provide an interface between other application software executing on the electronic device 700 and hardware resources of the electronic device 700. More specifically, the O/S 722 may include a set of computer-executable instructions for managing hardware resources of the electronic device 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The optional DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the electronic device 700, the optional input/output (I/O) interface(s) 706 may have the same or substantially the same features, operation, and/or functionality as described above with respect to input/output (I/O) interface(s) 606. The electronic device 700 may further include one or more network interface(s) 708 via which the electronic device 700 may communicate with any of a variety of other systems, platforms, networks, devices, and so forth. The network interface(s) 708 may enable communication, for example, with one or more servers, computing devices, one or more wireless routers, one or more host servers, one or more web servers, and the like via one or more of networks. The transceiver(s) 712 may have the same or substantially the same features, operation, and/or functionality as described above with respect to transceiver(s) 612.

It should be appreciated that the program module(s), applications, computer-executable instructions, code, or the like depicted in FIG. 6 as being stored in the data storage 620, or depicted in FIG. 7 as being stored in the data storage 720, are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 600, electronic device 700 and/or hosted on other computing device(s) accessible via one or more networks, may be provided to support functionality provided by the program module(s), applications, or computer-executable code depicted in FIG. 6, FIG. 7 and/or additional or alternate functionality. Further, functionality may be modularized differently such that processing described as being supported collectively by the collection of program module(s) depicted in FIG. 6 and/or or FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 and/or FIG. 7 may be implemented, at least partially, in hardware and/or firmware across any number of devices.

It should further be appreciated that the server 600 and/or electronic device 700 may include alternate and/or additional hardware, software, or firmware components beyond those described or depicted without departing from the scope of the disclosure. More particularly, it should be appreciated that software, firmware, or hardware components depicted as forming part of the server 600 and/or electronic device 700 are merely illustrative and that some components may not be present or additional components may be provided in various embodiments. While various illustrative program module(s) have been depicted and described as software module(s) stored in data storage 620 and/or data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., preestablished or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a control server comprising one or more processors coupled to memory, a request to retrieve selected data and send the selected data to an electronic device associated with a user account, wherein the selected data corresponds to a first data category corresponding to purchase history data indicative of purchases associated with the user account, a second data category corresponding to searching data indicative of searches associated with the user account, a third data category corresponding to installation data indicative of installations associated with the user account, or a fourth data category corresponding to voice data indicative of voice information associated with the user account;
receiving identification data associated with the user account and a passcode for verifying the authenticity of the identification data;
determining that the passcode corresponds to the identification data associated with the user account;
determining that the selected data corresponds to the first data category, the second data category, the third data category, or the fourth data category;
determining that the selected data is located on a data server by consulting a data location table associated with the data server and comprising information corresponding to the identification data and the first data category, the second data category, the third data category, or the fourth data category;
retrieving the selected data from the data server;
preparing the selected data to be sent to the electronic device by compressing and encrypting the selected data; and
sending the selected data to the electronic device.

2. The method of claim 1, further comprising deleting the selected data from the data server.

3. The method of claim 2, further comprising, after deleting the selected data from the data server, periodically determining whether the selected data is located on the data server and, based on the selected data being located on the data server, deleting the selected data from the data server.

4. The method of claim 1, wherein sending the selected data to the electronic device comprises sending an electronic link for accessing the selected data to an email address associated with the user account.

5. A method comprising:
receiving, by a computer system comprising one or more processors coupled to memory, identification data and instructions corresponding to management of selected data, the selected data associated with the identification data and a data category;
determining an action to be performed on the selected data using the instructions;
determining a location of the selected data based on the data category and the identification data;
causing the action to be performed, wherein the action to be performed on the selected data comprises deleting the selected data from a first server;
sending a notification to a user account associated with the identification data, the notification confirming that the action has been performed on the selected data; and
periodically determining, after causing the action to be performed, whether the selected data is present on the first server, wherein periodically determining includes determining more than once, on a periodic basis.

6. The method of claim 5, further comprising receiving authentication data for verifying the authenticity of identification data and determining that the authentication data corresponds to the identification data associated with the user account.

7. The method of claim 5, wherein the action to be performed further comprises deleting the selected data from a second server that is not in direct communication with the first server.

8. The method of claim 5, further comprising, after causing the action to be performed, again deleting the selected data from the first server if it is determined that the selected data is present on the first server.

9. The method of claim 8, further comprising adding a second entry to a log of the second deleting of the selected data.

10. The method of claim 5, further comprising:
receiving second instructions corresponding to management of second selected data;
determining second action to be performed on the second selected data using the second instructions; and
causing the second action to be performed, wherein the second action is retrieving the second selected data from the first server.

11. The method of claim 5, further comprising adding an entry to a log of actions performed, the entry indicative of the action performed according to the instructions.

12. The method of claim 5, wherein determining the location of the selected data comprises determining a presence of information corresponding to the identification data and the data category in a database corresponding to a server.

13. The method of claim 5, further comprising receiving second instructions corresponding to management of second selected data, the second selected data associated with the identification data and a second data category corresponding to one of purchase history data indicative of purchases associated with the user account, searching data indicative of searches associated with the user account, installation data indicative of installations associated with the user account, or voice data indicative of voice information associated with the user account.

14. The method of claim 5, wherein determining on the periodic basis is based on hours, days, or weeks.

15. The method of claim 5, wherein a frequency of periodically determining is configurable.

16. A data management device comprising:
   memory configured to store computer-executable instructions, and
   at least one computer processor configured to access memory and execute the computer-executable instructions to:
      receive identification data and instructions corresponding to management of selected data, the selected data associated with the identification data and a data category;
      determine an action to be performed on the selected data using the instructions;
      determine a location of the selected data based on the data category and the identification data;
      cause the action to be performed, wherein the action to be performed on the selected data comprises deleting the selected data from a first server;
      send a notification to a user account associated with the identification data, the notification confirming that the action has been performed on the selected data; and
      periodically determine, after causing the action to be performed, whether the selected data is present on the first server, wherein to periodically determine includes determine more than once, on a periodic basis.

17. The data management device of claim 16, wherein the at least one computer processor is further configured to access memory and execute the computer-executable instructions to:
   receive authentication data for verifying the authenticity of identification data; and
   determine that the authentication data corresponds to the identification data associated with the user account.

18. The data management device of claim 16, wherein to determine on the periodic basis is based on hours, days, or weeks.

19. The data management device of claim 16, wherein a frequency of periodically determining is configurable.

20. The data management device of claim 16, wherein the at least one computer processor is further configured to access memory and execute the computer-executable instructions to:
   delete, after the action is performed, the selected data for a second time from the first server based on determining that the selected data is present on the first server; and
   add an entry to a log of the second deletion of the selected data.

\* \* \* \* \*